US010422678B2

(12) United States Patent
Lang et al.

(10) Patent No.: US 10,422,678 B2
(45) Date of Patent: Sep. 24, 2019

(54) CORIOLIS FLOW SENSOR ASSEMBLY

(71) Applicant: General Electric Company, Schenectady, NY (US)

(72) Inventors: Philipp Lang, Bad Waldsee (DE); Jens Rütten, Wegberg (DE); Charles Erklin Seeley, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 99 days.

(21) Appl. No.: 15/832,473

(22) Filed: Dec. 5, 2017

(65) Prior Publication Data

US 2019/0170553 A1    Jun. 6, 2019

(51) Int. Cl.
  *G01F 1/84*    (2006.01)
  *G01F 15/06*   (2006.01)
  *G01N 9/18*    (2006.01)

(52) U.S. Cl.
  CPC ............ *G01F 1/8418* (2013.01); *G01F 1/849* (2013.01); *G01F 1/8472* (2013.01)

(58) Field of Classification Search
  CPC combination set(s) only.
  See application file for complete search history.

(56) References Cited

U.S. PATENT DOCUMENTS

| 5,115,683 | A | 5/1992 | Pratt |
| 5,497,666 | A | 3/1996 | Patten et al. |
| 5,555,190 | A | 9/1996 | Derby et al. |
| 5,691,485 | A * | 11/1997 | Endo ............... G01F 1/8409 73/861.357 |
| 6,748,813 | B1 | 6/2004 | Barger et al. |
| 8,931,346 | B2 * | 1/2015 | Rieder ............. G01F 1/8413 73/658 |
| 9,823,110 | B2 * | 11/2017 | Lin ............... G01F 23/284 |
| 2011/0032959 | A1 * | 2/2011 | Ueno ............. G01D 5/266 372/26 |
| 2015/0377673 | A1 | 12/2015 | Seeley et al. |
| 2017/0205263 | A1 | 7/2017 | Kunze |

OTHER PUBLICATIONS

U.S. Appl. No. 15/384,806, filed Dec. 20, 2016, Rütten.
Clark et al., The Influence Upon Coriolis Mass Flow Meters of External Vibrations at Selected Frequencies, The Flow Measurement and Instrumentation, Mar.-Apr. 2003, pp. 33-42, vol. 14, Issue 1-2.
Smith et al., A MEMS-Based Coriolis Mass Flow Sensor for Industrial Applications, IEEE Transactions on Industrial Electronics, Apr. 2009, pp. 1066-1071, vol. 56, Issue 04.
Enoksson et al., A Silicon Resonant Sensor Structure for Coriolis Mass-Flow Measurements, Journal of Microelectromechanical Systems, Jun. 1997, pp. 119-125, vol. 06, Issue 02.

* cited by examiner

*Primary Examiner* — Jewel V Dowtin
(74) *Attorney, Agent, or Firm* — Arent Fox, LLP

(57) ABSTRACT

Provided is a Coriolis flow sensor assembly that includes a fluid flow assembly, including a flow tube, wherein the fluid flow assembly is configured to provide a flow path through the flow tube. The flow tube has at least one region of increased stiffness, which may be a result of a structural support component coupled to the flow tube. In another embodiment, the increased stiffness is caused by integral properties of the flow tube.

21 Claims, 13 Drawing Sheets

CORIOLIS FLOW SENSOR ASSEMBLY

BACKGROUND

The present disclosure relates generally to Coriolis flow sensors. More specifically, the present disclosure relates to a Coriolis flow sensor assembly with structural modifications that improve sensitivity of the measurements performed by the Coriolis flow sensor.

Accurate measurements of the properties of fluids delivered through flow systems is important for a variety of applications, such as in bioprocessing systems and oil and gas pipelines. One technique for measuring the properties of fluids is by using the flow rate. This permits measurements to be performed during fluid delivery, which is advantageous for reducing associated operating costs. That is, active flow systems may be operational during measurement. Flow rates may be measured either as volumetric flow rates or mass flow rates. Volumetric flow rates are accurate if the density of the fluid is constant; however, this is not always the case as the density may change significantly with temperature, pressure, or composition. As such, mass flow rates are typically more reliable for measuring fluid flow. One method for measuring mass flow rates is through a Coriolis flow sensor (e.g., a flow meter). In general, a Coriolis flow sensor measures mass flow rates via the Coriolis force that results from the fluid as it moves through an oscillating tube.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible embodiments. Indeed, the disclosure may encompass a variety of forms that may be similar to or different from the embodiments set forth below.

Provided herein is an assembly including a structural support component configured to receive a flow tube, the flow tube being configured to provide a flow path for a fluid. Further, the assembly includes a mechanical drive assembly configured to drive an oscillation of the flow tube and the structural support component while fluid is flowing through the flow path, and wherein oscillation of the flow tube in at least one plane is decreased when the flow tube is coupled to the structural support component.

Provided here in is an assembly including a flow tube configured to provide a flow path through the flow tube, wherein the flow tube has a first region and a second region, the first region and the second region both having a greater stiffness than a third region. Further, the assembly includes a mechanical drive assembly configured to drive an oscillation of the flow tube while fluid is flowing through the flow path.

Provided herein is a system including a fluid flow assembly, the fluid flow assembly comprising a flow tube, wherein the fluid flow assembly is configured to provide a flow path through the flow tube, wherein the flow tube is formed from a material having a first stiffness at a first location and a second stiffness at a second location, the first stiffness being different than the second stiffness. Further, the system includes a mechanical drive assembly configured to drive an oscillation of the flow tube while fluid is flowing through the flow path. Even further, the system includes a sensor configured to sense the oscillation of the flow tube and generate a signal indicative of the oscillation.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
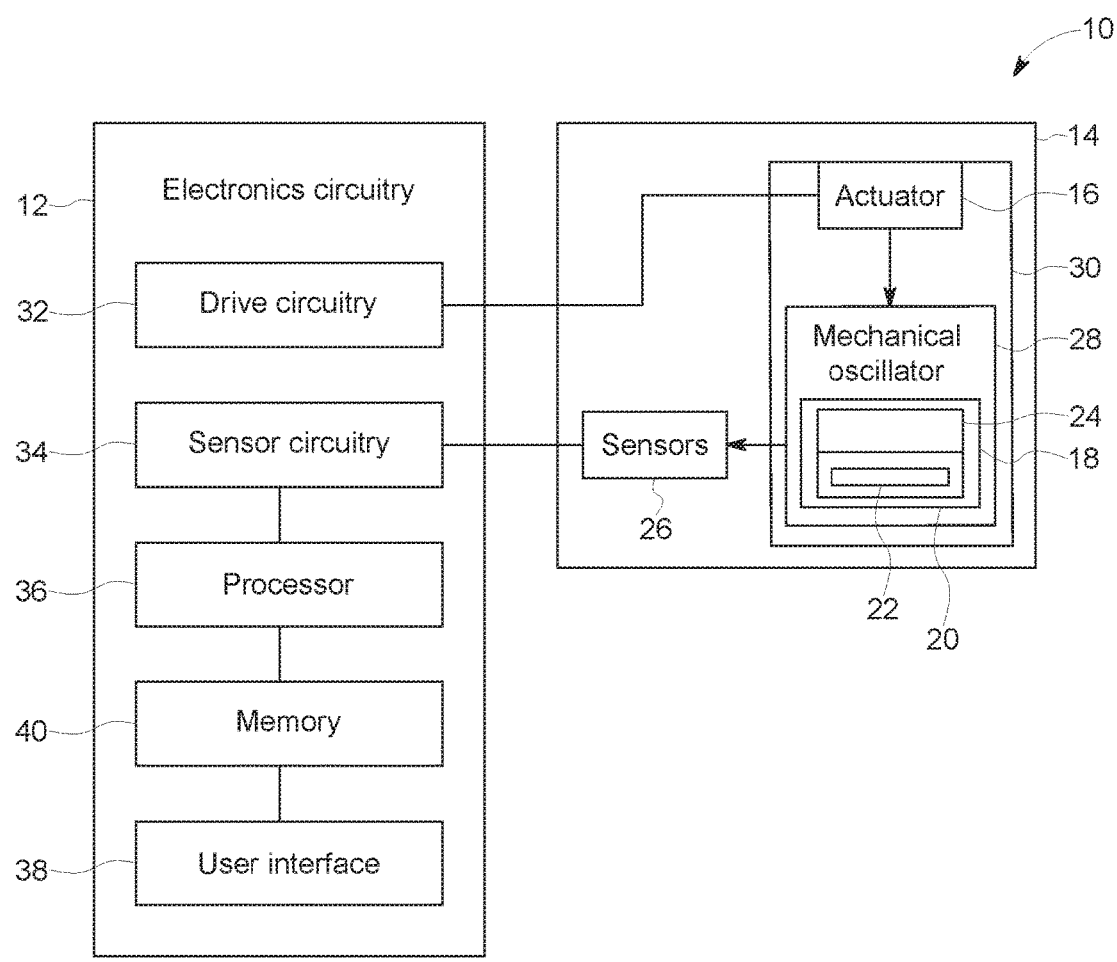
FIG. 1 is a block diagram of a Coriolis flow sensor system in accordance with the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Coriolis flow sensors are useful in numerous applications that involve fluid delivery, such as bioprocessing systems. In general, a Coriolis flow sensor operates by measuring a phase shift of one or more oscillating flow tubes that results from a Coriolis force. It is beneficial to provide a Coriolis flow sensor designs that increases the effect of the Coriolis force, which in turn results in an increased mass flow sensitivity and sensing amplitude (high signal to noise ratio: SNR). Certain Coriolis flow sensors are often used in conjunction with a continuous tubing that is uniform along its length.

Certain approaches to implementing Coriolis flow sensors aim to magnify the flow sensitivity by shaping the tubing, and the corresponding fluid flow path, into favorable geometrical forms. However, in addition to improving the sensitivity of the Coriolis flow sensor measurement, the Coriolis flow sensor should also be robust against environmental disturbances that may impact the accuracy of sensor readings. Many approaches to modifying the geometric form of the tubing often result in large tubing loops that have no advantage in zero point stability because external disturbances are also magnified (which in turn decrease sensor accuracy). Thus, the effective signal to noise ratio may remain the same. Further, these configurations also take up additional space in a fluid flow system, and looped geometric form modifies the fluid flow path; which influence pressure loss, flow velocity, shear rate, trappings, draining, and abrasion.

The present disclosure is directed to a Coriolis flow sensor assembly with an improved signal to noise ratio. The assembly may include a flow tube (e.g., a disposable flow tube) with features that reduce loss of oscillation forces. In an embodiment, the Coriolis flow sensor assembly may include a flow tube with variable stiffness along its length. As discussed in detail below, variable stiffness along the flow tube improves the performance of the Coriolis flow sensor assembly by increasing the Coriolis phase shift of the oscillating tube and by reducing contributions from other oscillation modes (e.g., structural oscillation modes) to the oscillation imparted by the mechanical drive assembly. In certain embodiments, the variable stiffness along the flow tube results from modifications of the flow tube (e.g., varying the inner wall thickness or varying the material of the flow tube alone its length). In other embodiments, the variable stiffness along the flow tubes is a result of external structural support components that impart stiffness to certain axes that include oscillation modes that tend to contribute to sensor noise. Further, the incorporation of the variable stiffness features permits the Coriolis flow sensor assembly to be used without looped or other geometric flow tube structures. For example, the disclosed techniques may be applied to a Coriolis flow sensor assembly with a straight or unlooped flow tube, to reduce or eliminate certain disadvantages associated with conventional looped sensor flow tubes (e.g., taking up space, effects of modifying the fluid flow path). That is, the signal to noise ratio improvements achieved via the disclosed techniques are achieved with a straight or unlooped flow tube. However, it should be understood that the disclosed techniques may also be used in conjunction with flow tubes with looped or other geometric shapes to augment signal to noise ratio improvements in such assemblies.

Turning now to the figures, FIG. 1 is a diagram illustrating an embodiment of the Coriolis flow sensor system 10. The Coriolis flow sensor system 10 includes electronics circuitry 12 coupled to a sensor assembly 14. The sensor assembly 14 may include a flow tube and one or more features that provide increased stiffness to the flow tube.

Figure 2:
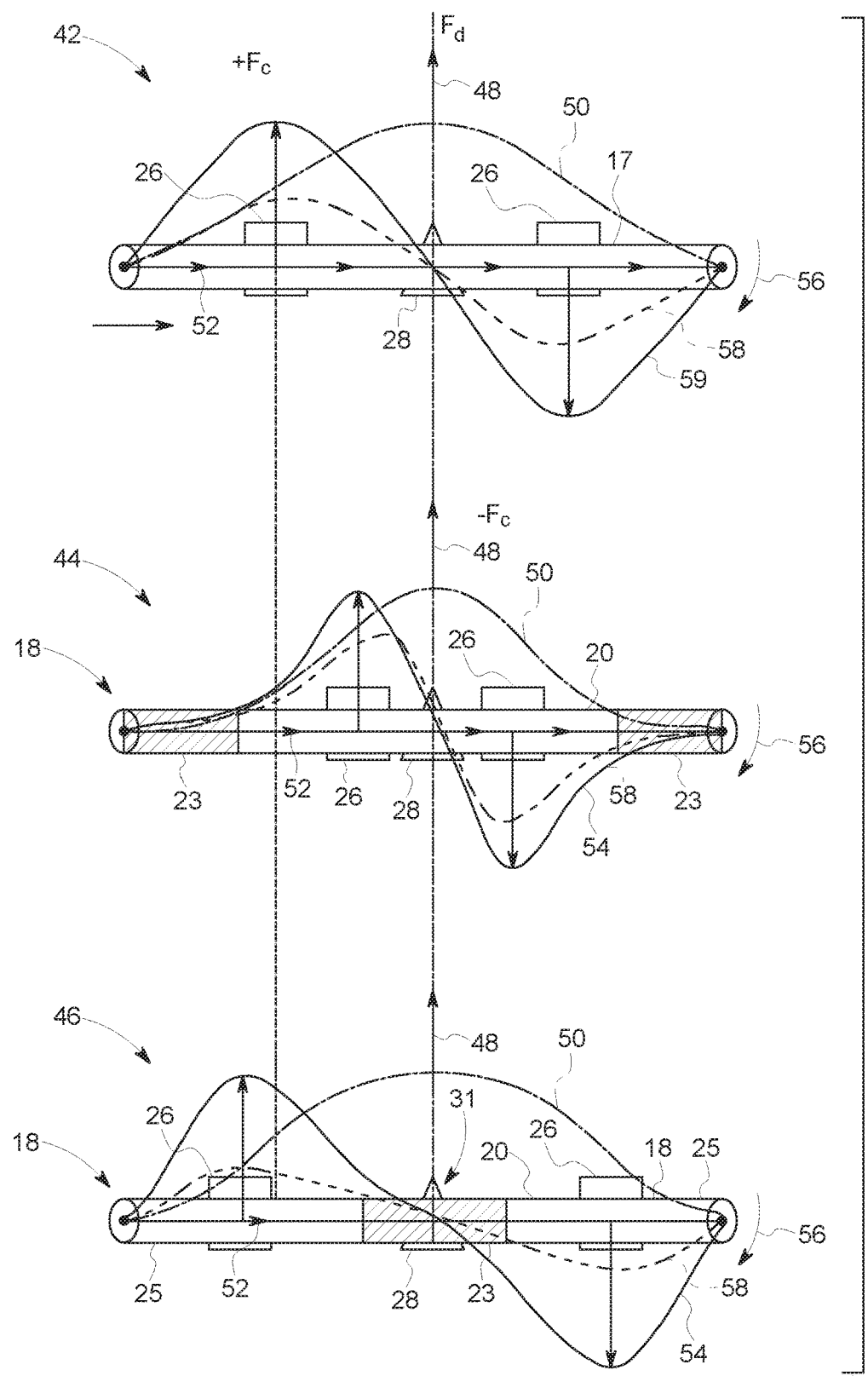
FIG. 2 is schematic diagram of oscillations of Coriolis flow sensor assemblies in operation in accordance with the present disclosure.

In one embodiment, the sensor assembly 14 includes a fluid flow assembly 18 that provides variable stiffness along a flow tube forming a fluid flow path. For example, the sensor assembly may include a variable stiffness flow tube 20 for retaining a fluid 22. In another embodiment, the variable stiffness flow tube 20 may be coupled to a structural support component 24 that provides and/or augments the variable stiffness by constraining the movement of the flow tube 20 in certain axes. In certain embodiments, the variable stiffness may be achieved via features integral to the flow tube 20 itself, and the flow tube 20 may be used in conjunction with the system 10 with or without the structural support component 24. In other embodiments provided herein, the structural support component may be used in conjunction with a uniform stiffness flow tube (i.e., a flow tube not including the variable stiffness features disclosed herein or a flow tube having a generally constant stiffness along its length, such as the flow tube 17 as shown in FIG. 2)

Additionally, the sensor assembly 14 may, in certain embodiments, include one or more sensors 26 and one or more actuators 16. It would be appreciated by those skilled in the art that one or more components of the sensor assembly 14 may be configured as disposable parts, and that other components may be configured as re-usable resident parts. To that end, in implementations in which certain components are disposable, the disposable components may be separable (e.g., by an operator using appropriate tools or by hand) from the resident parts. For example, at least one of the flow tubes 20, the one or more actuators 16, or the one or more sensors 26 may be disposable parts, and other parts are configured as reusable resident parts. It would be appreciated by those skilled in the art that the disposable part(s) may be replaced at very low cost in intervals governed by the specific process needs. In addition, in some implementations, the flow tube 20 may be changed), without the need for replacement of the entire Coriolis flow sensor. The disposable-part sub-system allows obtaining high accuracy measurements, reusing of part of the Coriolis flow sensor system 10, provides a flexibility for single-use applications, and achieves cost and material savings.

Referring to FIG. 1, in some embodiments, the flow tube 20 may be coupled with a mechanical oscillator 28 or form an assembly with the mechanical oscillator 28 and, thus, take the form of a rigid, oscillating tubing during operation of the mechanical oscillator 28. The one or more actuators 16 are used to induce oscillations of an appropriate amplitude over a required frequency range in the fluid 22 through the mechanical oscillator 28 and the flow tube 20. The mechanical oscillator 28 and the actuator 16 are referred to collectively as the mechanical drive assembly 30. The one or more sensors 26 are configured to provide signals indicative of a Coriolis response caused by the fluid 22 flowing through the flow tube 20. The one or more sensors 26 may include, for example, electromagnetic sensors, or optical sensors, and associated components.

The flow tube 20 may be configured as a conduit with an internal passage that permits fluid flow and may be formed in a shape including, but not limited to single, dual or multi loop configurations, split flow, straight tube, counter- or co-flow configurations. In some implementations, the flow tube 20 is made from, for example, a polymer whose influence on the oscillation modes (harmonic frequencies) of the mechanical oscillator is not dominant. In some other examples, the flow tube 20 is made of metal. In yet other examples, the flow tube 20 is made of glass. The flow tube material, in some examples, is tailored to specific requirements of the bioprocessing application, such as temperature, pressure, and the characteristics of the fluid to be measured (e.g., corrosivity). Further, the flow tube 20 may be implemented with wall thickness or material features to promote the variable stiffness along its length as provided herein. The flow tube 20 may be arranged to permit in-line fluid flow sensing for a fluid processing system. Accordingly, the flow tube may be in fluid communication with fluid conduits of a larger fluid processing system.

The Coriolis flow sensor system 10 also includes electronics circuitry 12 coupled to the sensor assembly 14. The electronics circuitry 12 includes drive circuitry 32 to trigger the one or more actuator(s) 16 to generate oscillations in the flow tube 20 of the desired frequency and magnitude. The Coriolis flow sensor system 10 further includes sensor circuitry 34 to receive the Coriolis response from the flow tube 20. The electronics circuitry 12 further includes a processor 36 to process the Coriolis response signals received from the sensors 26 to generate one or more measurements representative of one or more properties of the fluid. These measurements are displayed via a user interface 38. The electronics circuitry 12 also includes a memory 40 to store the measurements for further use and communication, to store data useful for the drive circuitry 32, and the sensor circuitry 34.

In operation, the electronics circuitry 12 triggers the one or more actuator(s) to generate oscillations in the flow tube 20, which are transferred to the fluid 22. Due to these oscillations, the Coriolis response (vibration amplitude and phase) is generated in the fluid and is sensed by the sensors 26 through the flow tube 20. The sensed Coriolis response signal from the sensors 26 are transmitted to the electronics circuitry 12 for further processing to obtain the measurements of the one or more properties of the fluid including fluid flow.

The system 10 may be used to assess fluid characteristics in any fluid flow system. As disclosed, the fluid characteristics may be assessed during operation of a variety of manufacturing and/or fluid flow processes. Some applications for the system 10 described herein include fabrication of wafers in semi-conductor industry, and medical applications that involve use of organic fluids. Some of these are high purity applications, and use of flow tube 20 made of for example polymer, or other chemically inert material is advantageous in such applications. In some other applications, a flow tube 20 formed of electrically inert and low thermal conductivity material like glass is advantageous.

FIG. 2 illustrates oscillation diagrams 42, 44, and 46 of example oscillation modes. The oscillation diagram 42 shows a uniform stiffness flow tube 17 relative to oscillation diagrams 44 and 46, which show fluid flow assemblies 18 with flow tubes 20 having variable stiffness that may be used in conjunction with the Coriolis flow sensor system 10 as provided herein. As shown, each flow tube 20 may be coupled to a mechanical oscillator 28 that drives the oscillation of each flow tube 20. The system 10 may include two sensors 28 that sense the oscillation.

The flow tubes 20 shown in oscillation diagrams 44 and 46 include one or more regions 23 of increased stiffness positioned along to the flow tube 20. The regions of increased stiffness are relative to regions 25 that are less stiff.

Figure 7:
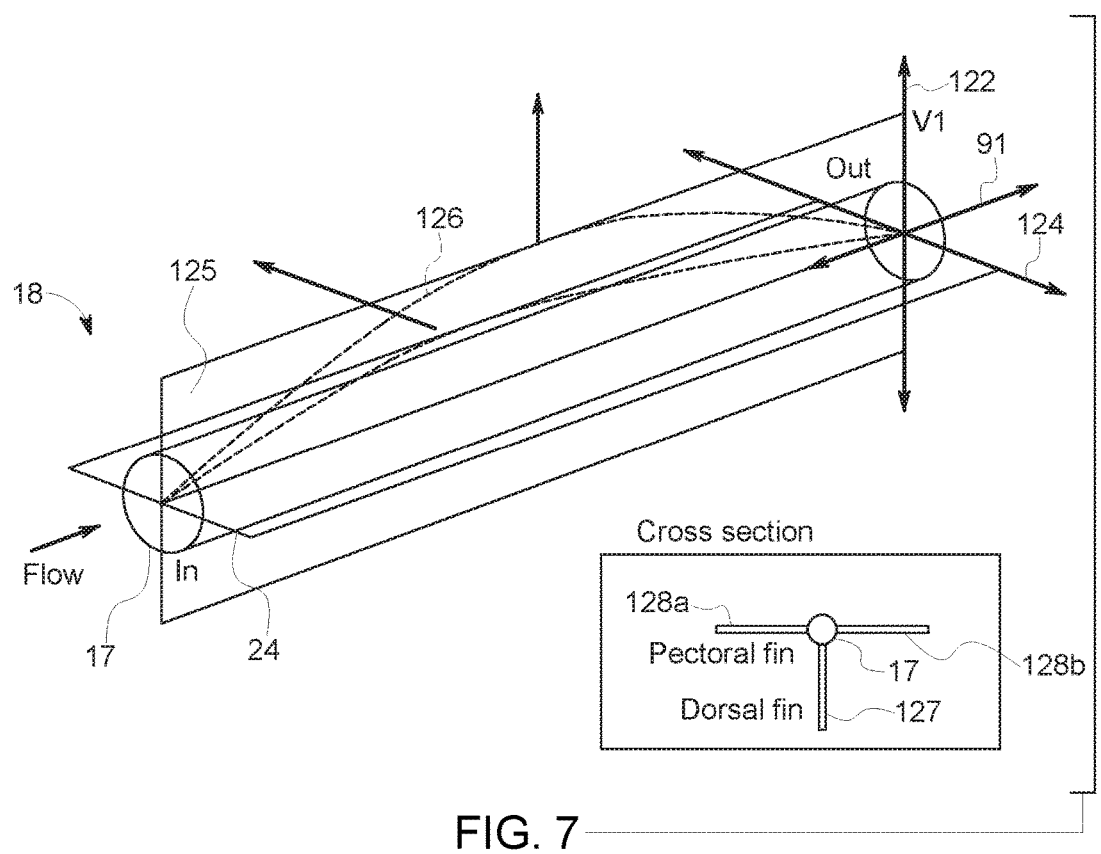
FIG. 7 is a schematic illustration of lateral and vertical oscillation of a flow tube of a Coriolis flow sensor assembly in accordance with the present disclosure.

In certain embodiments, the increased stiffness may result from one or more of the flow tube 20 being formed from different materials in the one or more regions 23 relative to the regions 25 that are less stiff, increased wall thickness of the flow tube 20 in the regions 23 relative to wall thickness of the flow tube 20 in the less stiff regions 25, or via one or more structural support components 24 (e.g., as shown in FIG. 7) coupled to the flow tube.

In operation, a force 48 is applied to approximately the center 31 of the flow tube 20, as measured along the length or fluid flow axis (e.g., as shown by the flow arrow 52) and which may correspond to half the distance between a fluid entry point 27 and a fluid exit point 29 of the flow tube 20, by the mechanical oscillator 28 of the mechanical drive assembly 30. The force 48 results in a typical drive deflection shape 50. Upon a flow 52 (e.g., of fluid 22, shown flowing in the direction of the arrow 52), a Coriolis force distribution 54 is exerted on the flow tube 20, resulting in a rotation 56 of the flow tube. The combination of the Coriolis force distribution 52 and the drive deflection shape 50 is a Coriolis deflection shape 58.

The Coriolis deflection shape, w, depends on the Coriolis force distribution 52 and the bending stiffness of the flow tube. A Coriolis phase shift, $\Delta t$, is determined by a relationship between the drive deflection shape 48, v, of the flow tube and Coriolis deflection shape 58, w at a specific frequency, f.

$$\Delta t = -\frac{1}{f}\tan^{-1}\left(\frac{w}{v}\right)$$

As discussed above, Coriolis phase shift is used to measure properties of the fluid and the rate of fluid flow. In general, a greater Coriolis phase shift results in a higher sensitivity of measurement. The Coriolis phase shift can be determined with the relationship of drive displacement to Coriolis displacement.

A variable bending stiffness along the oscillator axis (e.g., in the direction of the force 48) influences at both the drive deflection shape 48 and the Coriolis force distribution, resulting in a modified Coriolis deflection shape. Moreover, the variable bending stiffness shifts the Coriolis force distribution along oscillator axis, which shifts the Coriolis force distribution 54 towards oscillation maximum. Oscillation diagrams 44 and 46 illustrate how the Coriolis deflection shape 52 changes with variable stiffness distributions imparted by the regions 23 of increased stiffness. Schematic 44 illustrates that increased stiffness at the ends of the oscillator axis (i.e., at the fluid entry point 27 and the fluid exit point 29), shifts the Coriolis force distribution 64 maximum towards the center of the oscillator. Hence, the Coriolis force cause a higher Coriolis movement in the sensed area, which results in an increased phase shift. As shown in schematic 48, when the region or regions 23 of increased stiffness are positioned at the center 31 of the flow tube, the drive deflection shape 48 may be flattened at the center. Thus, the Coriolis force distribution 52 and Coriolis deflection shape are defocused and shifted towards the rotation axis, resulting in less Coriolis phase shift relative to homogeneous bending stiffness or increased bending stiffness near to the rotation axis. Accordingly, in certain embodiments, the flow tube 20 is provided with one or more regions 23 of increased stiffness that are positioned adjacent to the fluid entry point 27 and/or the fluid exit point 29 of the flow tube 20. Further, the flow tube 20 may have one or more regions 23 of increased stiffness that are positioned to avoid or exclude the midpoint 31 of the flow tube 20 (e.g., the midpoint between the fluid entry point 27 and the fluid exit point 29). The flow tube 20 may have one, two, or any number of regions 23 of increased stiffness.

Figure 3:
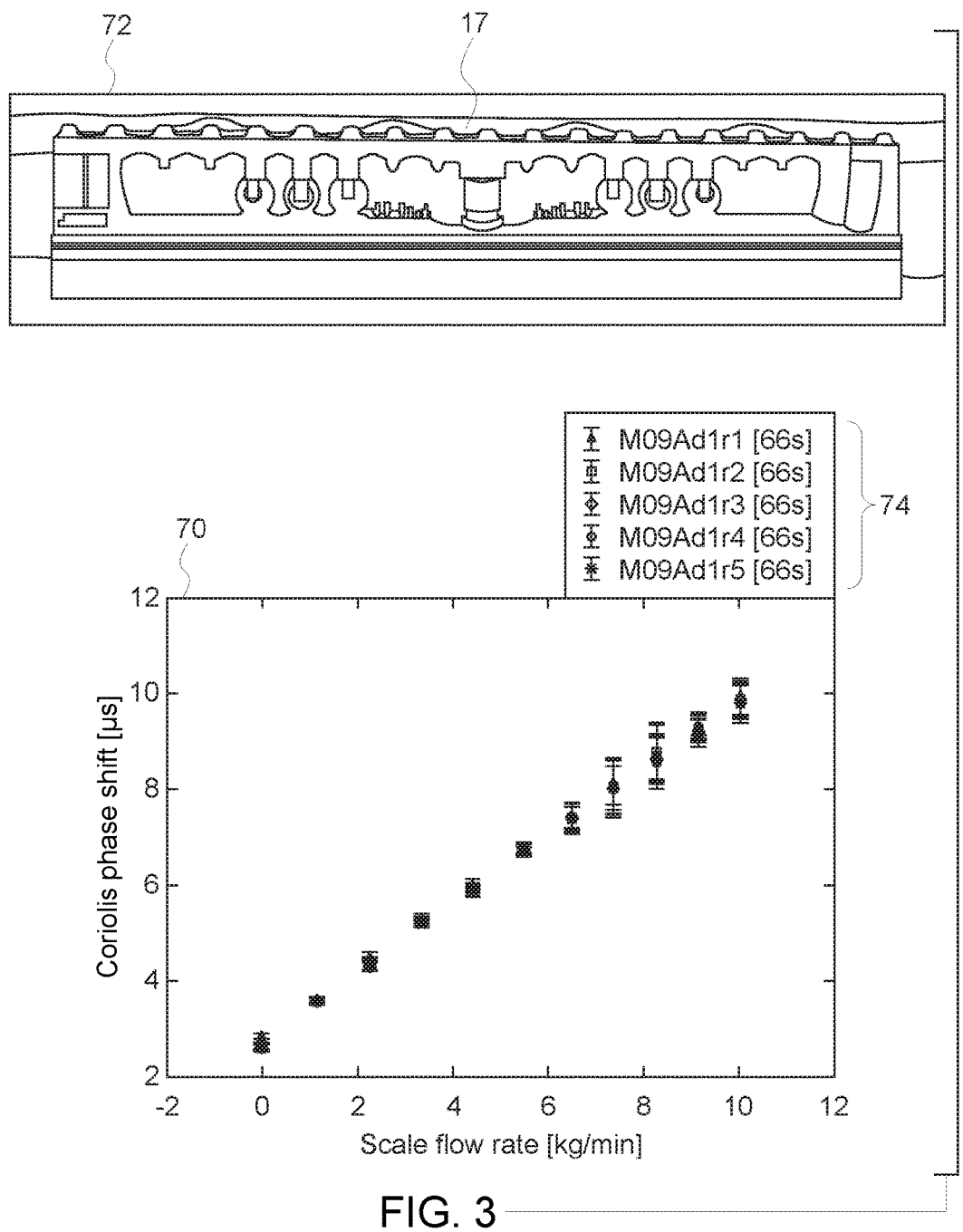
FIG. 3 shows the Coriolis phase shift of a flow tube having a uniform stiffness.

FIG. 3 shows experimental results for assessing Coriolis phase shift in conjunction with a uniform stiffness flow tube 17 with a constant stiffness and a corresponding graph 70 of the Coriolis phase shift sensitivity. An image 72 shows the experimental setup for determining the Coriolis phase shift sensitivity (e.g., Coriolis phase shift based on flow rate) with the flow tube coupled to a mechanical drive assembly 30. The graph 70 displays the Coriolis phase shift versus the scale flow rate (kg/min). Points 74 represent repeated measurements of the Coriolis flow sensor having flow tube 20 illustrated in image 72. For this configuration, the measured Coriolis phase shift ranges from approximately 2 to 10 μs from a flow rate up to 10 kg/min. The measured Coriolis phase shift of flow tube shown in image 72 is 4 μs based on a 4.7 kg/min flow and a 150 Hz drive oscillation.

Figure 4:
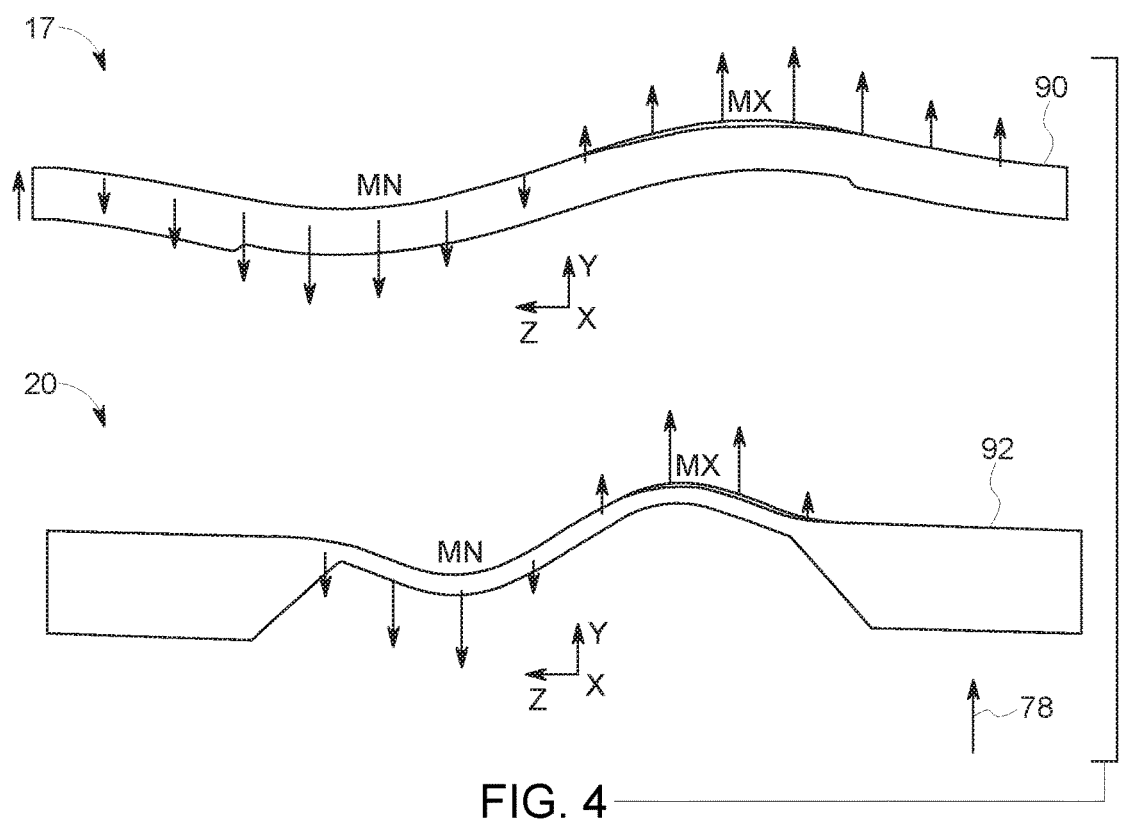
FIG. 4 shows a comparison of phase shifts of flow tubes of a having uniform stiffness or a variable stiffness in accordance with the present disclosure.

FIG. 4 is a schematic illustration comparing phase shifts between a uniform stiffness flow tube 17 and a variable stiffness flow tube 20 having the variable stiffness (e.g., along the axis 78), in accordance with the present disclosure. Flow tube 17 has a continuous stiffness distribution and has a phase shift of 4 μs based on a 4.7 kg/min flow and a 150 Hz drive oscillation, calculated using Finite Element Analysis (FEA). The phase shift of flow tube 20 is 37 μs based on a 4.7 kg/min flow and a 150 Hz drive oscillation is, calculated using FEA.

Figure 5:
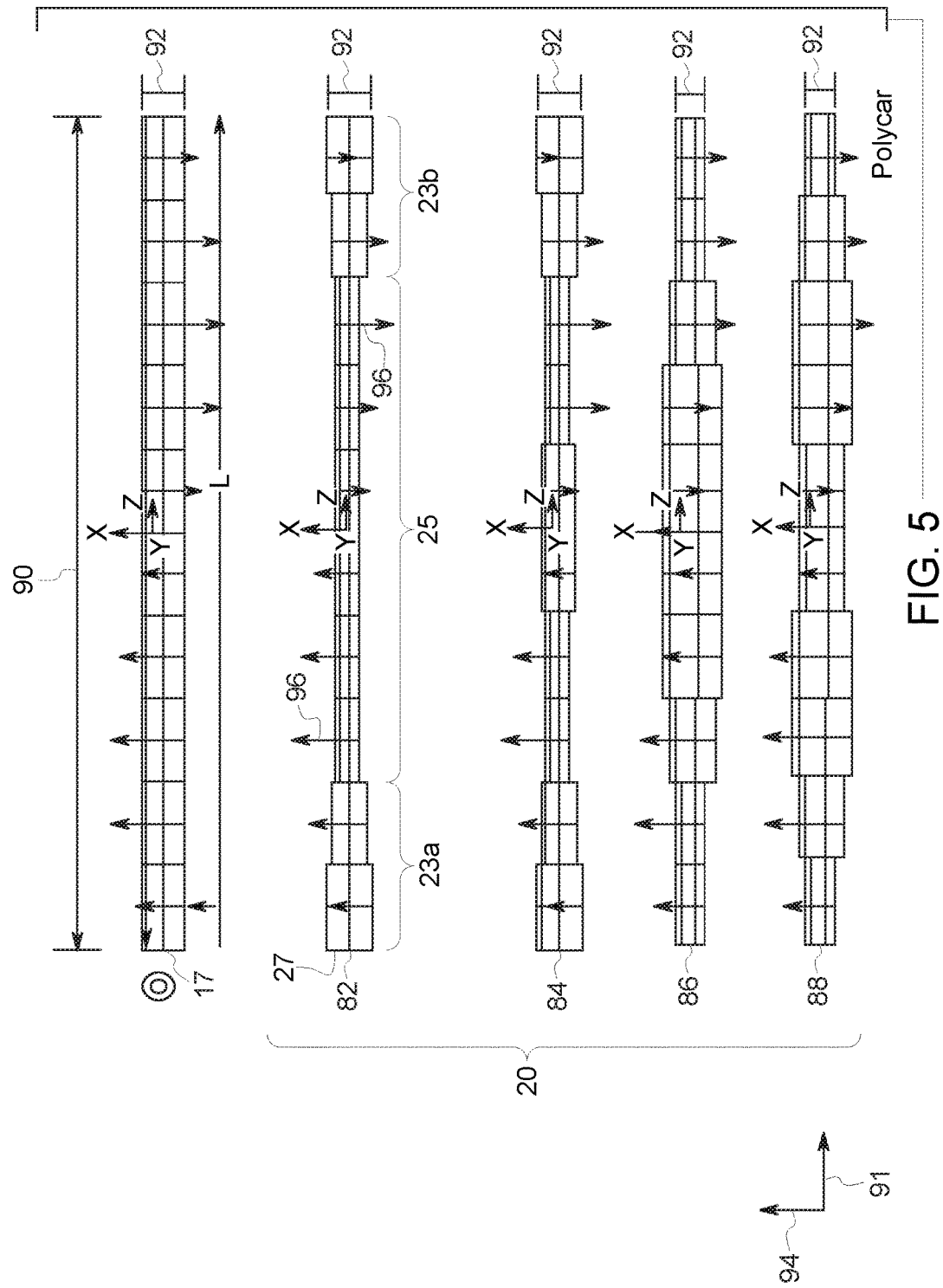
FIG. 5 shows phase shifts of Coriolis flow sensor assemblies having flow tubes with uniform or variable stiffness in accordance with the present disclosure.

FIG. 5 shows the uniform stiffness flow tube 17 relative to various implementations of the variable stiffness flow tube 20 (illustrated as flow tubes 82, 84, 86, and 88) with a variable bending stiffness distributions with corresponding Coriolis phase shift sensitivities that calculated using Finite Element Analysis (FEA). Each flow tube 17, 20 has a variable bending stiffness across the length 90 (e.g., flow axis 91). The magnitude of the bending stiffness of each flow tube 17, 20 is related to the height 92 along the axis 94 (e.g., vertical axis). For example, flow tube 82 has two regions of greater bending stiffness within approximately the first 25% and last 25% of the length of each flow tube. Flow tubes 84, 86, and 88 show variable (e.g., graded) stiffness along the length of each flow tube.

The phase difference, At, of each flow tube 17, 20 (82, 84, 86, and 88) was calculated using Finite Element Analysis (FEA) simulations based on a constant flow of 4.7 kg/min and a flow tube inner diameter (ID) of 6.3 mm. The lengths of each arrow 96 (several are annotated in FIG. 4) represents the magnitude of the Coriolis force on the flow tubes 17, 20 (82, 84, 86, and 88). The calculated phase difference of flow tubes 17, 20 (82, 84, 86, and 88) is 4.5, 8.1, 14.3, 12.4, 4.4, 2.9 μs, respectively. Each calculated phase difference is measured at the same position for each flow tube. The flow tube 82 had the highest phase difference of the flow tubes represented herein (e.g., a phase difference of 14.3 μs), which indicates it has the highest sensitivity. Thus, FIG. 5 shows that there is a distribution of stiffness across the flow tube 20 that results in the greatest performance (e.g., high flow sensitivity). While the flow tubes 17, 20 (82, 84, 86, and 88) shown in FIG. 5 are all generally straight about the flow axis, it should be appreciated by one of ordinary skill in the art that the effect of improved performance with a modified stiffness of the flow tubes 20 extends to flow tubes of other geometries as provided herein. Accordingly, as provided herein, the flow tube 20 may be formed having a lower (e.g., minimum) stiffness region 25 that extends across the midpoint 31 and that is flanked by relatively higher or increased stiffness regions 23. The increased stiffness regions 23 of the flow tube 20 may have stepped or nonconstant thickness such that individual locations within the increased stiffness region or regions 23 have increased stiffness relative to the lower stiffness region 25 but may have different stiffness relative to other locations in the increased stiffness region or regions 23. It should also be understood that other implementations are contemplated. For example, the flanking increased stiffness regions 23a and 23b may have the same stiffness as one another or may have different stiffness relative to one another while being nonetheless higher in stiffness than the lower stiffness region 25. Further, the increased stiffness regions 23a and 23b may be the same length or different lengths. In addition, the increased stiffness region 23a or 23b may be eliminated in certain implementations. In one embodiment, the increased stiffness region 23 (e.g., 23a and/or 23b) may be about 5-30% of a total length of the flow tube 20, as measured from the fluid entry point 27 to the fluid exit point 29. The lowest stiffness region 25 may be about 20-80% (e.g., 20-30%, 20-40%, 20-50%, 30-60%) of a total length of the flow tube 20, as measured from the fluid entry point 27 to the fluid exit point 29. In addition, the lowest stiffness region 25 may be symmetrical about the midpoint 31 or may be asymmetric with respect to the midpoint 31. Regardless of the specific configuration, the flow tube 20 may be configured such that a first location on the flow tube has a different stiffness (e.g., determined from geometry, harmonic motion, or Young's modulus) than a second location spaced apart from the first location along the fluid flow path.

Figure 6:
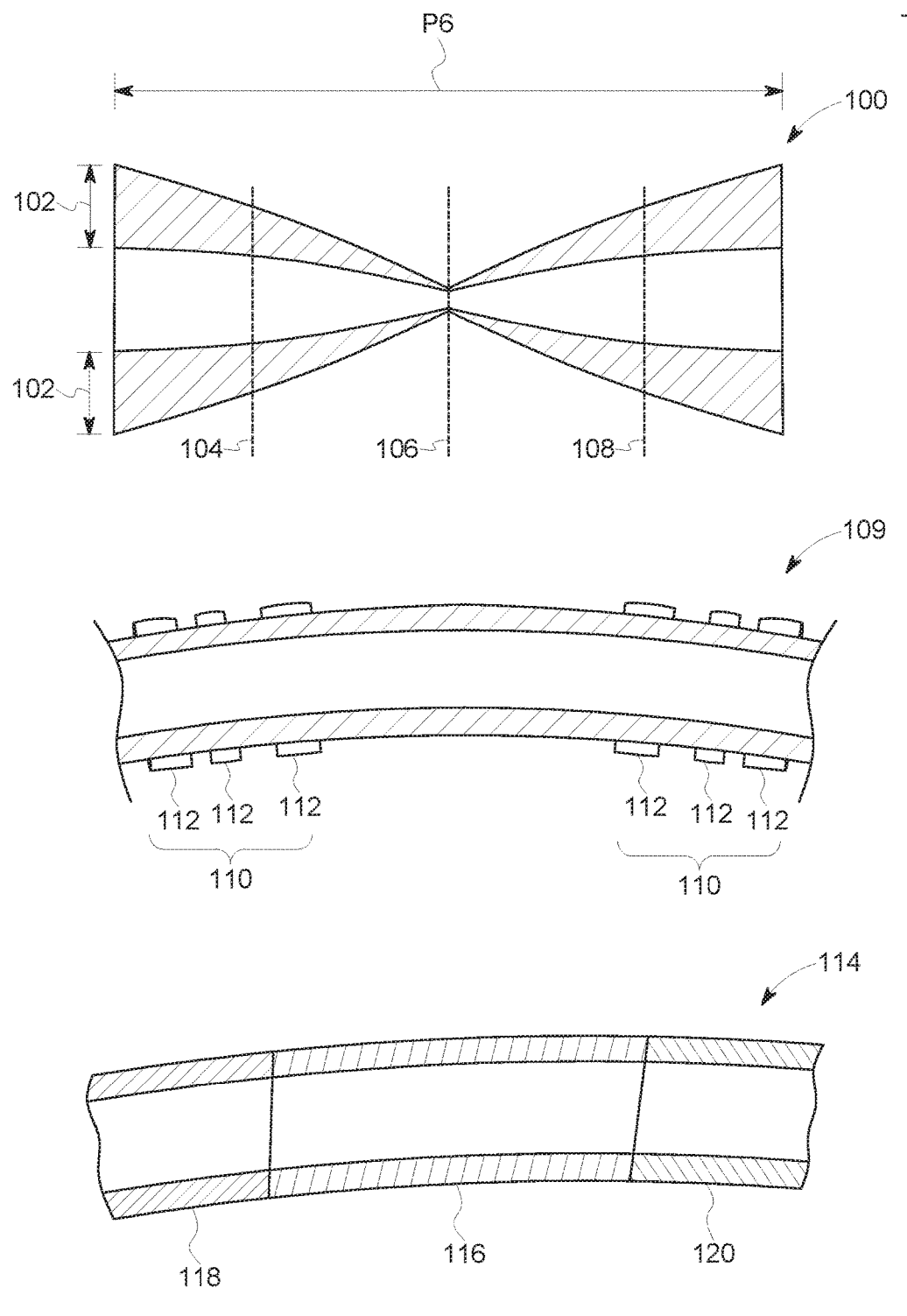
FIG. 6 is an illustration of implementations of a flow tube of a Coriolis flow sensor assembly having variable stiffness in accordance with the present disclosure.

FIG. 6 shows cross-sectional views of several exemplary implementations for a variable stiffness flow tube 20 with variable stiffness along the length of the flow tube 20 for use in conjunction with the Coriolis flow sensor system 10 as provided herein. Flow tube 100 has a gradually varying wall thickness 102 along the length 90 that imparts the increased stiffness. While flow tube 100 illustrates a linear variation in thickness 102, any grade change of thickness is permissible. In general, the flow tube has a greater thickness at locations 104 and 108 relative to location 106. Flow tube 109 has increased stiffness at the ends 110 resulting from periodically-spaced increased thickness regions 112, e.g., ribs of increased thickness that are distributed at locations to promote higher signal to noise ratios. Flow tube 114 illustrates variable stiffness achieved through variable material composition of the flow tube. For example, the center of the flow tube is made of a first material 116 which is flanked by material 118 and material 120. Materials 118 and 120 may be the same or different materials. The relative stiffness of materials 116, 118, and 120 may differ with regards to the desired variable stiffness. For example, materials 118 and 120 may be stiffer than material 116 to achieve an increased stiffness on the ends. Such variation in thickness or materials may be achieved using appropriate extrusion parameters when manufacturing the flow tube 20. Further, the variable stiffness of the flow tube 20 may be achieved by providing additives or stiffeners (e.g., additive particles, wire) to the material of the flow tube 20 in the increased stiffness region(s) 23 and not in the lower stiffness region 25. In certain embodiments, any change in thickness or material composition may be about the entire circumference of the flow tube 20, while in other embodiments the change in thickness or material composition may be applied to only part of the circumference of the flow tube in an increased thickness region or location.

As discussed generally herein, varying the stiffness in the direction of the oscillation axis along the flow axis (e.g., axis 91) of the flow tubes modifies the oscillations (e.g., modes) along the oscillation axis (e.g., vertical axis 94). Additionally, there are other factors for tuning the oscillation that result in an increased Coriolis phase shift. FIG. 7 is a schematic illustration of a vertical axis 122 and a lateral axis 124 along a flow tube 20. As shown, the oscillation 126 occurs in a plane 125 spanning the vertical axis 122 and the flow axis 91. Unwanted harmonic modes (e.g., structural modes) may occur along the axes 122 and 124 and contribute to the Coriolis deflection shape (e.g., Coriolis deflection shape 58; FIG. 2). In order to damp or shift the frequency of unwanted harmonic modes of tubing fluid flow assembly 18, additional structural features may be added to either a uniform stiffness flow tube 17, as shown, or a variable stiffness flow tube 20 (e.g., modal features). Structural features along certain axes (e.g., 122 and 124) may provide independent influence on the different vibration modes with a variable cross section that adjusts (e.g., shift the frequency of the harmonic mode up, shift the frequency down, or decrease the amplitude) the unwanted harmonic modes until the effect of the unwanted harmonic modes is negligibly, resulting in increased sensitivity and robustness of the Coriolis flow sensor assembly. The features that alter the unwanted harmonic modes (e.g., modal features) may have various designs, structures, and properties to address different modes.

For example, modal features may include vertical fin structures 127 to increase stiffness in the vertical axis 122, resulting in better control of the Coriolis deflection shape. Additionally, modal features may include lateral fin structures 128 (e.g., pectoral fins) to adjust (e.g., prevent, shift, or decrease) modes along the lateral axes 124. The lateral fin structures 128 increase the stiffness in the lateral plane while providing little to no negative effects on the modes along the vertical axis 122. In one embodiment, the vertical fin structure 127 may be formed integrally with the structure of the flow tube 20 via an extension or a variable thickness of the walls of the flow tube. In certain embodiments, the vertical fin structure or other structures as provided herein may be implemented as a structural support component 24 that is coupled to the flow tube 20. In one embodiment, the structural support component 24 is reversibly coupled to the flow tube 17 or the flow tube 20 to permit exchanging or replacing used flow tubes while retaining the reusable components of the sensor assembly 14 (FIG. 1). It should be appreciated by one of ordinary skill in the art that the structural support component 24 addition to modify the stiffness of the flow tube as discussed in FIG. 5. Moreover, one of ordinary skill in the art would recognize that an attachable structural support component may be suitable for a disposable (e.g., attachable and removable) or reusable flow tube. When coupled to the flow tube (e.g., flow tube 17 or flow tube 20), the structural support component 24 is configured to permit oscillation of the coupled flow tube. In certain embodiments, the structural support component oscillates together with the flow tube.

FIGS. 8 and 11-13 illustrate different embodiments of a Coriolis flow sensor. In particular, FIGS. 8 and 11-13 show a flow tube coupled to a structural support component 24 having different features (e.g., fins) and an associated Coriolis phase shift sensitivity measurement. In general, the embodiments discussed below show increased Coriolis phase shift sensitivity, which is exemplified by the range of measured Coriolis phase shifts based on flow rates.

Figure 8:
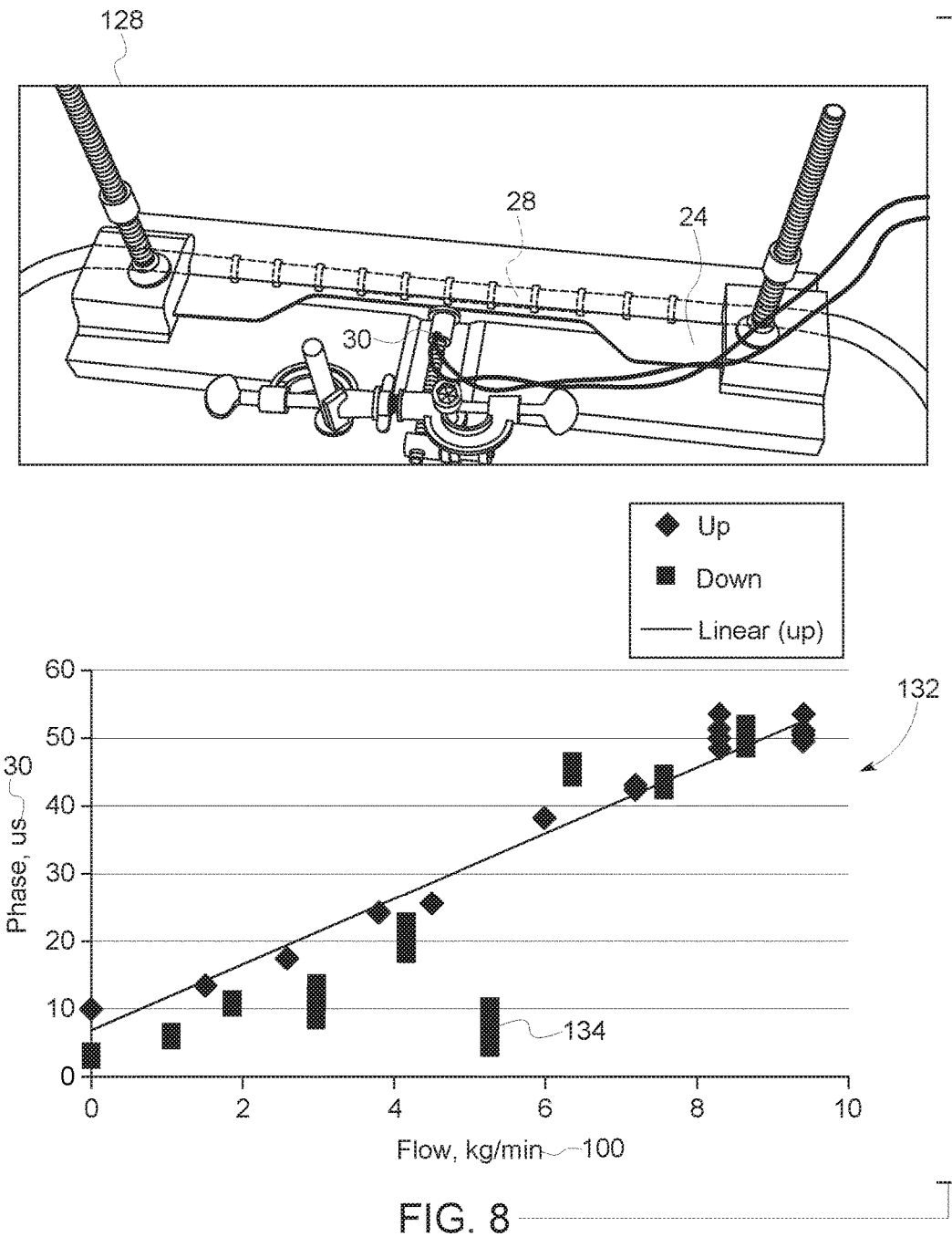
FIG. 8 shows phase shifts of a structural support component having a dorsal fin in accordance with the present disclosure.

FIG. 8 shows a vertical fin structural support component 24 coupled to the flow tube in accordance with the present disclosure. Image 128 shows the experimental setup used to determine the Coriolis phase shift sensitivity based on variable flow rates. The image 128 shows the flow tube, the oscillator 28, and the vertical fin structural support component 24. The graph 130 shows the Coriolis phase shift versus the flow rate of the flow tube in image 128. The points 132 from the measured Coriolis phase shift versus flow rate generally fit a line.

Figure 9:
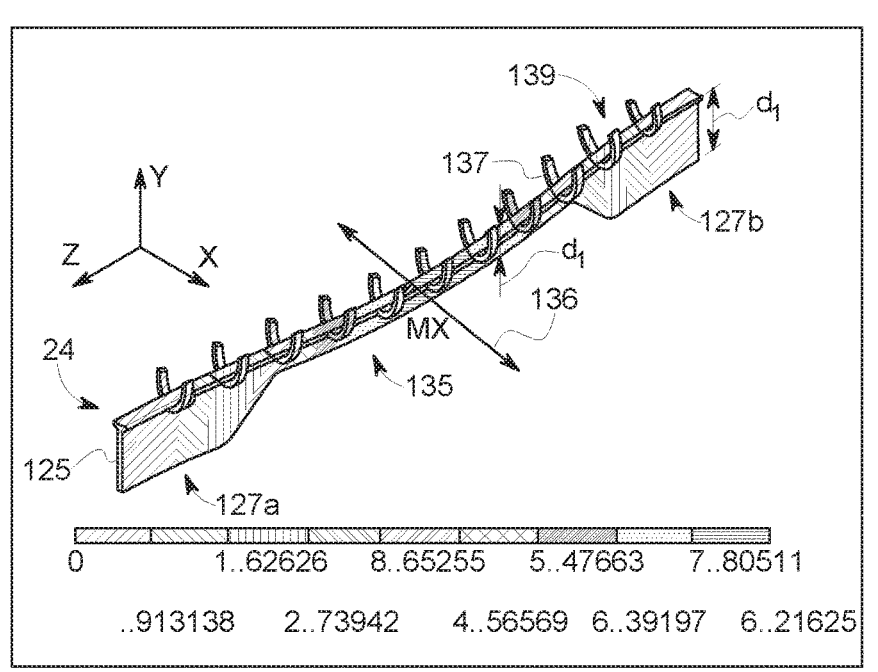
FIG. 9 shows the lateral and drive oscillation mode of a structural support component having a dorsal fin in accordance with the present disclosure.
Figure 9:
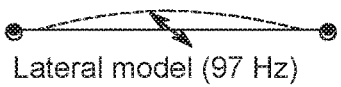
Figure 9:
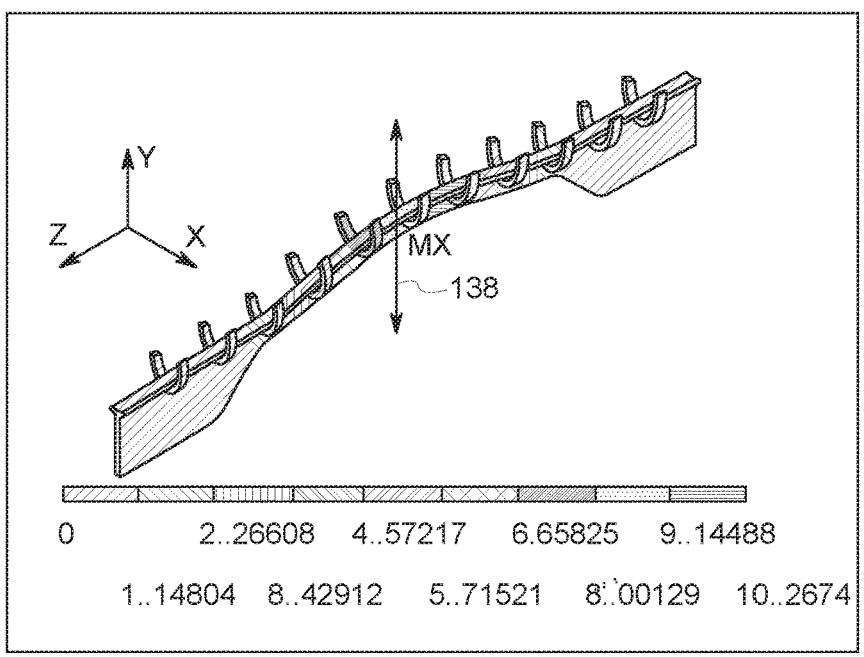
Figure 9:

FIG. 9 shows the lateral mode 136 and drive or operating mode 138 of an implementation of the structural support component 24. The FEA simulation shows the lateral mode has a frequency of 97 Hz, which is close to the operating mode frequency of 150 Hz. It should be appreciated by one of ordinary skill in the art that while the Coriolis flow sensor assembly performed well (e.g., the measured phase shifts for a given flow rate fit a linear equation) additional modifications (e.g., modal features) may improve the performance of the Coriolis flow sensor assembly for certain conditions (e.g., flow rates). The illustrated structural support component 24 may have a body 125 that includes extending fin portion(s) 127 that are generally positioned at areas that correspond with the flow tube ends (e.g., the fluid entry point 27 and exit point 29) and that extend away from the flow tube a distance $d_1$. The body is thinner in a center portion 135, e.g., extending to a distance $d_2$ that is less than $d_1$. To couple to the flow tube, the body 125 includes a plurality of ribs 137 that form a receiving area 139 and that are sized and shaped to couple to the flow tube (e.g., flow tube 17 or flow tube 20), for example by forming a partial annulus about the flow tube that permits an operator to insert and/or remove the flow tube. A flow tube, when coupled to the structural support component 24, would experience decreased oscillation along a lateral plane extending outwardly from the lateral mode arrows 136.

Figure 10:
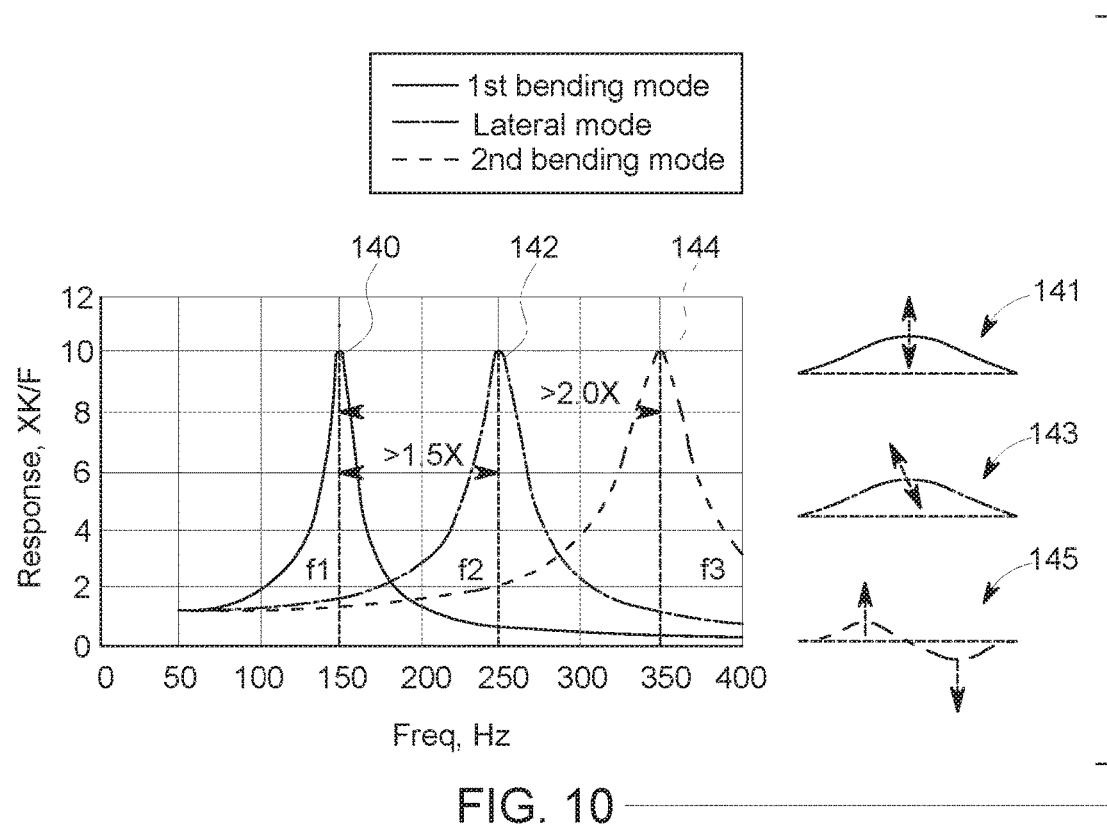
FIG. 10 shows various modes of oscillation of a flow tube of a Coriolis flow sensor in accordance with the present disclosure.

FIG. 10 shows a plot of the frequencies of the drive oscillation, 140, the lateral mode 142, and the bending mode 144. An illustration of the modes is shown in 141, 143, and 145 for each mode 140, 142, and 144 respectively. The structural support components adjust the harmonic mode (e.g., shift the frequency of the mode up or down or decrease the amplitude until the unwanted modes can be neglected). For example, a frequency margin of at least 1.5 between the drive oscillation and the lateral mode was found to significantly decrease the dynamic response of the lateral mode. Additionally, a frequency margin of at least 2.0 between the drive oscillation and the bending mode resulted in additional improvements of the performance of the Coriolis flow sensor assembly.

Figure 11:
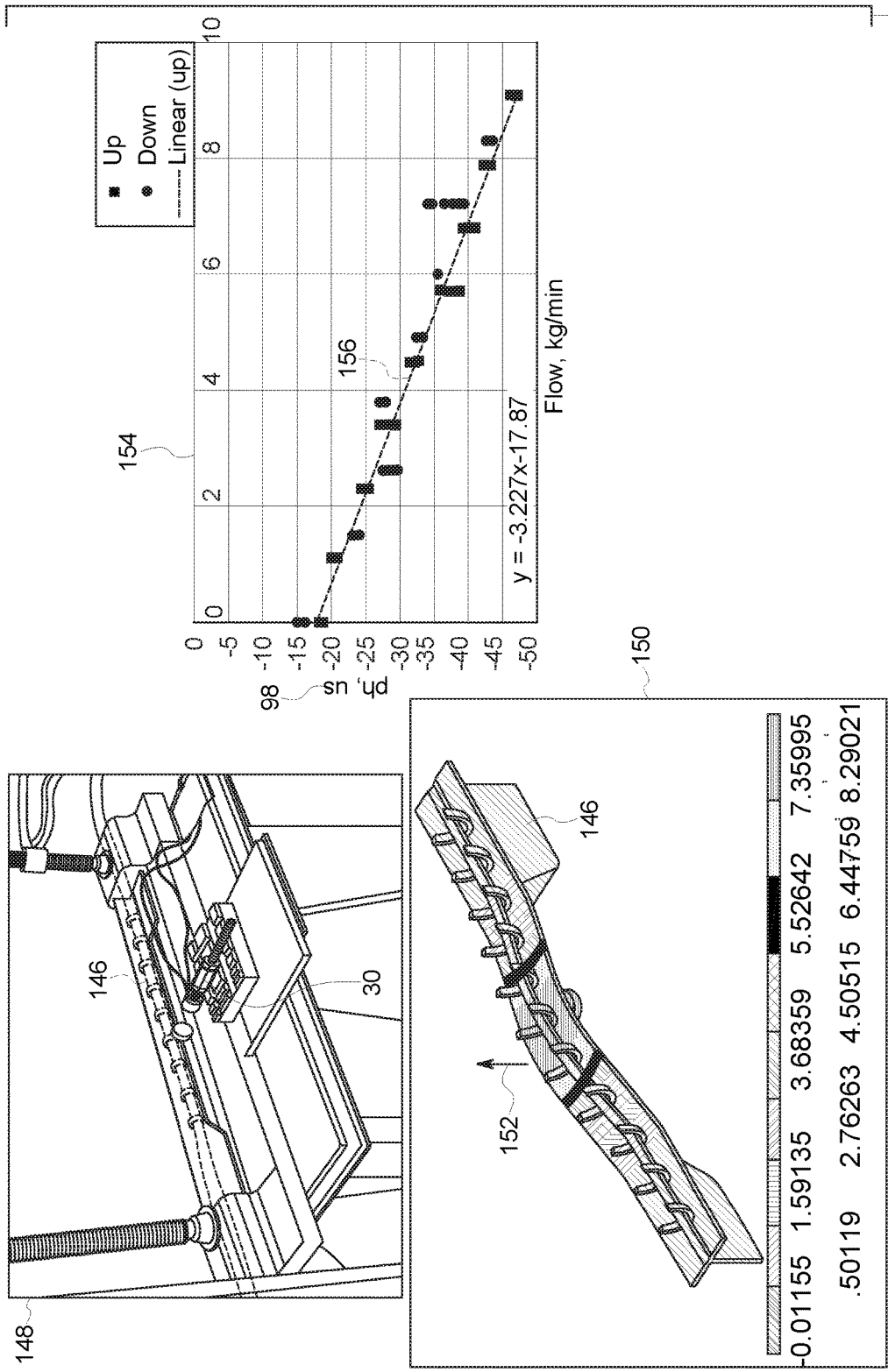
FIG. 11 shows the Coriolis phase shift sensitivity of a flow tube coupled to a structural support component having lateral and vertical fins in accordance with the present disclosure.

FIG. 11 shows the Coriolis phase shift sensitivity of a Coriolis flow sensor assembly including the flow tube 20 coupled to an implementation of the structural support component 24 having vertical fins and lateral fins in accordance with the present disclosure. Image 148 shows an experimental setup used to determine Coriolis phase shift sensitivity based on variable flow rates that includes the flow tube 20, the oscillator 30, and the structural support component 146. As shown in the schematic 150, the flow tube oscillates in a direction 152 that is perpendicular to the flow path. The graph 154 shows the Coriolis phase shift versus the flow rate of the flow tube depicted in image 146 having the structural support component 24 illustrated in schematic 150. The measured Coriolis phase shift versus flow rate for the flow tube 20 coupled to the structural support component 24 fits linear equation (e.g., represented as line 156). The measured Coriolis phase shift of a Coriolis flow sensor assembly including the structural support component 24 having vertical fins and laterals fins is 19 µs, which is greater than the 4 µs phase shift of a Coriolis flow sensor assembly having constant stiffness.

Figure 12:
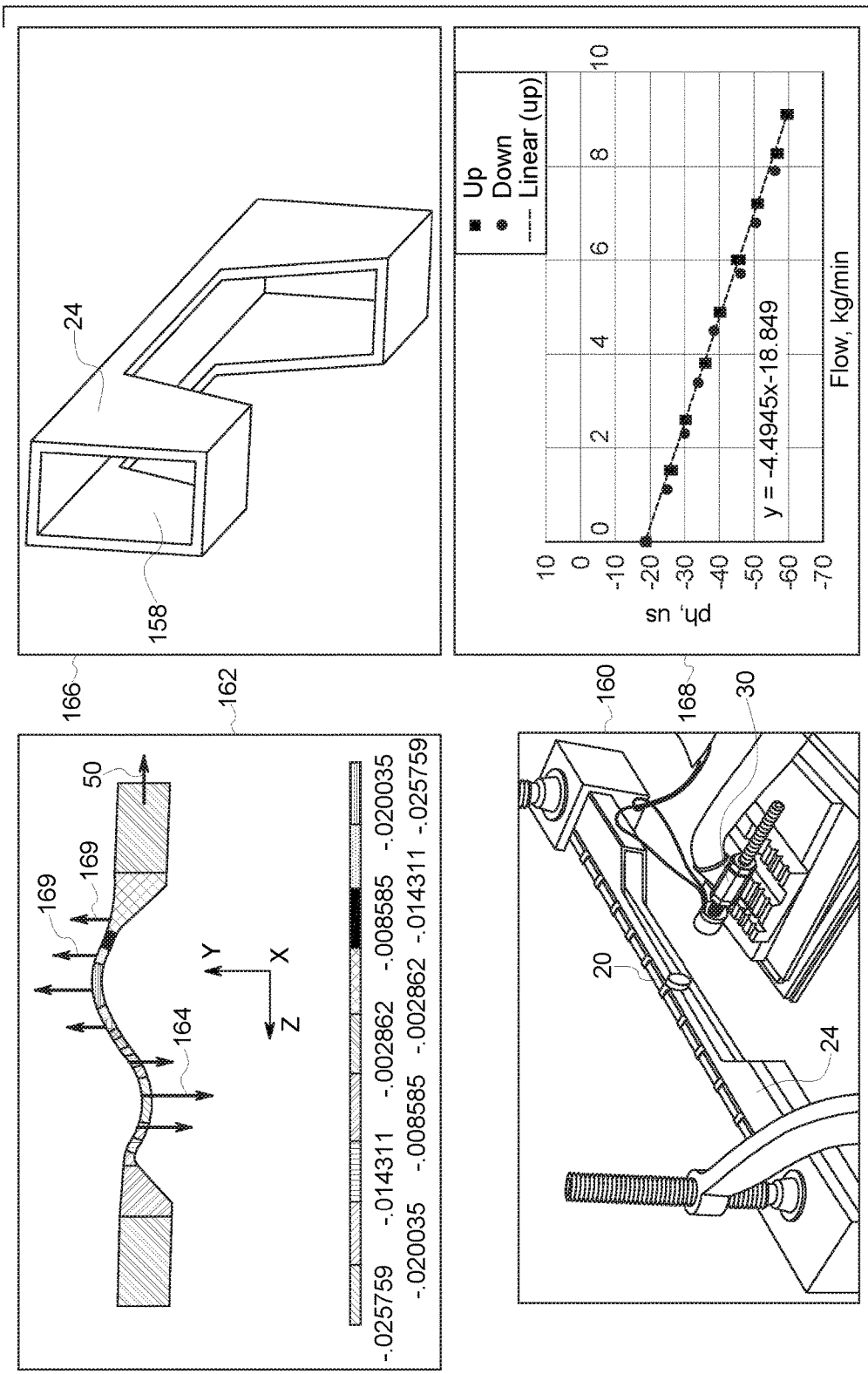
FIG. 12 shows the Coriolis phase shift sensitivity of a flow tube with a structural support component having dual fins in accordance with the present disclosure.

FIG. 12 shows the Coriolis phase shift sensitivity for a flow tube 20 coupled to an implementation of a dual fin structural support component 24 in accordance with the present disclosure. Image 160 shows an experimental setup used to determine the Coriolis phase shift sensitivity based on variable flow rates including the flow tube 20, the oscillator 30, and the dual fin structural support component 24. The dual fin structural support component 24 includes an interior space 158 between the fin structures. As illustrated, the interior space 158 is hollow; however, in other embodiments, the interior space 158 may be solid, or partially solid (e.g., porous), and may be composed of a material that is different than the rest of the dual fin structural support component 24. A first schematic 162 shows an illustration of the dual fin structural support component 24 with Coriolis forces illustrated as arrows 164. A second schematic 166 shows a side perspective view of the dual fin structural support component 24. The graph 168 shows the Coriolis phase shift versus the flow rate of the flow tube depicted in schematics 162, 166, and image 160. The measured Coriolis phase shift of a Coriolis flow sensor assembly including the dual fin structural support component 24 is 22 µs, which is greater than the 4 µs phase shift of a Coriolis flow sensor assembly having constant stiffness.

Figure 13:
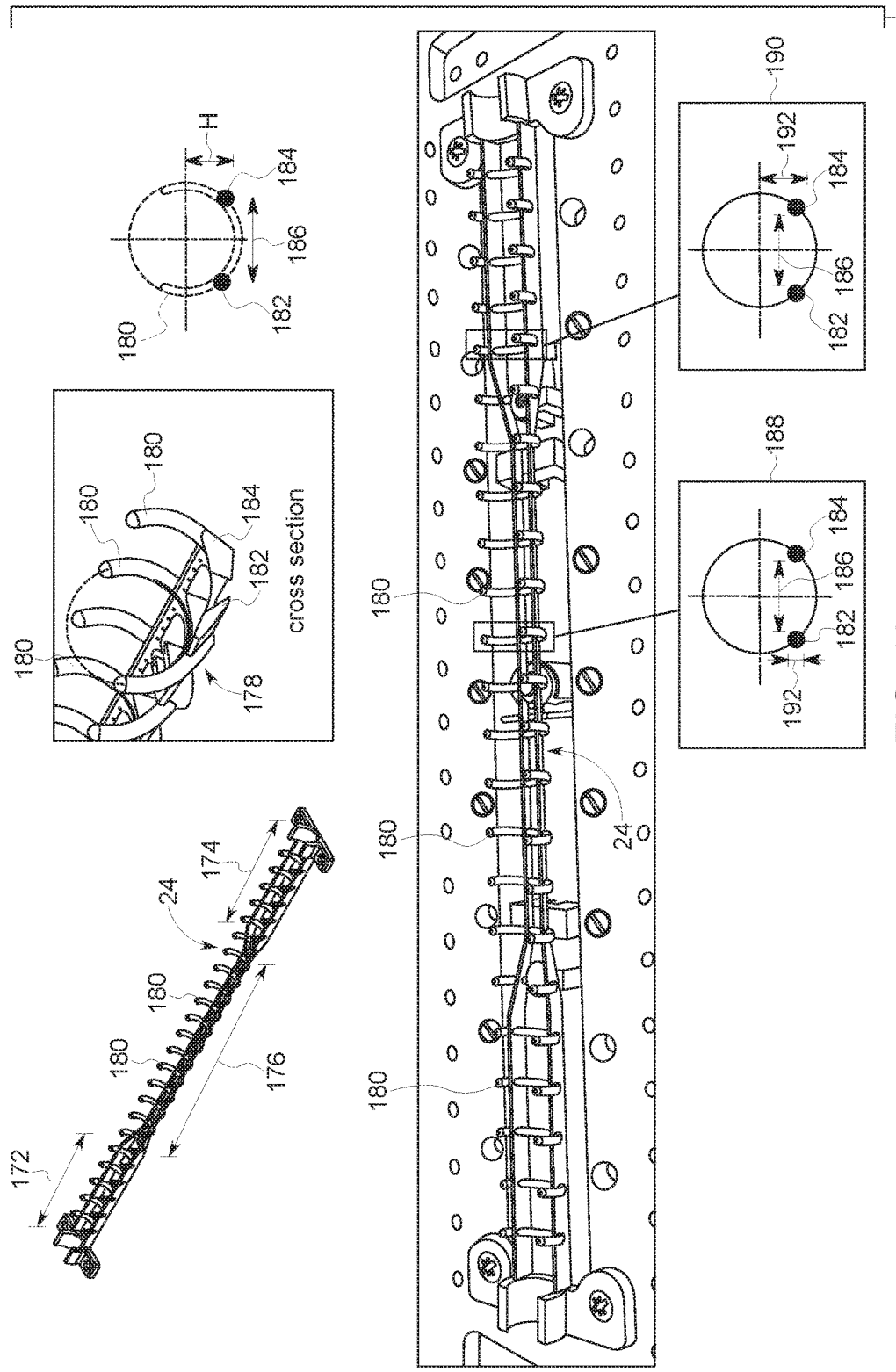
FIG. 13 is an illustration of a structural support feature in accordance with the present disclosure.

FIG. 13 shows a structural support feature 24 in accordance with the present disclosure. As discussed above, structural support features may be added to the Coriolis flow tube to reduce the effects of unwanted harmonic oscillations on the drive oscillation that results from the mechanical drive assembly 32. In general, structural support components may have features that address unwanted harmonic oscillations in one axis (e.g., either vertical or lateral). For example, although the structural support component having vertical fins shown in FIG. 8 improved the Coriolis phase shift sensitivity of the Coriolis flow sensor assembly, the Coriolis flow sensor assembly showed a lower sensitivity under certain conditions (e.g., at point 110). The structural support component 116 with lateral and vertical fins, shown in FIG. 10, results in increased Coriolis phase shift sensitivity; however, in certain embodiments, it would be recognized by one of ordinary skill in the art that additional features (e.g., modal features) may add less desirable bulkiness of the flow tube. FIG. 13 illustrates a structural support component 24 with features that address unwanted harmonic features along several axes. In general, the structural support component 24 permits different regions of the flow tube to have variable bending stiffness, lateral stiffness, and vertical stiffness. When coupled to the flow tube, the structural support component 24 may be in direct contact with the flow tube along an entirety of the length of the flow tube or, in certain embodiments, along some of a length of the flow tube.

The structural support component 24 illustrated in FIG. 13 has a first region 172, a second region 174, and a third region 176 along a back bone structure 178 having rib structures 180 that allow for the structural support component 24 to couple to the flow tube 20. The backbone structure 178 has a first backbone 182 and a second backbone 184 separated by a distance 186. The first region 172 and the second region 174 have similar structural features. Moreover, the distance 186 between the first backbone 182 and the second backbone 184 is similar. Image 188 illustrates a representative cross sectional view along the length of the structural support component 24 in the third region 176. Image 190 illustrates a representative cross sectional view along the length of the structural support component 24 in the first region 172 and the second region 174. As shown, the distance 186 between the first backbone 182 and the second backbone 184 (e.g., a greater arc length around the rib structure 180) in the first region 172 and second region 174 is greater than the distance 186 between the first backbone 182 and the second backbone 184 shown in image 190. A greater distance 186 results in greater lateral stiffness. Thus, the lateral stiffness along the flow tube 20 may be tuned based on the distance between the backbones 182 and 184.

As further illustrated in FIG. 13, the first backbone 182 and second backbone 184 have a variable thickness. In the first region 172 and the second region 174, the backbone has a greater thickness 192 than in the third region. The greater backbone thickness 192 results in a greater vertical stiffness of the flow tube 20 when the structural support component 170 is coupled to the flow tube 20. The thinner backbone thickness 192 of the third region 176 imparts a lower vertical stiffness to the flow tube 20 when the structural support component is coupled to the flow tube 20. Thus, the structural support component 170 may impart a variable vertical stiffness to the flow tube 20 in additional to a variable lateral stiffness.

The disclosure relates to a Coriolis flow sensor with features that reduce the contributions of unwanted harmonic modes to the oscillation resulting from the mechanical drive assembly. As discussed herein, the features may include a flow tube with variable stiffness, which may be implemented through features of the flow tube itself such as a variable wall thickness of the flow tube or through varying the material composition of the flow tube. Additionally, variable stiffness may be achieved by including structural support features integrally with or via an external structural support component coupled to the flow tube. The structural support component may include subcomponents (e.g., fins and backbones) that affect the stiffness of the flow tube along different axes that damp or shift the frequency of unwanted oscillations from the frequency of the oscillation imparted by the oscillator.

This written description uses examples to enable any person skilled in the art to practice the embodiments of the disclosure, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An assembly comprising:
   a structural support component configured to receive a flow tube, the flow tube being configured to provide a flow path for a fluid; and
   a mechanical drive assembly configured to drive an oscillation of the flow tube and the structural support component while fluid is flowing through the flow path, wherein oscillation of the flow tube in at least one plane is decreased when the flow tube is coupled to the structural support component.

2. The assembly of claim 1, wherein the structural support component comprises a body that extends away from the flow tube when the flow tube is coupled to the structural support component, wherein a first portion of the body extends away from the flow tube a first distance and wherein a second portion of the body extends away from the flow tube a second distance, the first distance being greater than the second distance.

3. The assembly of claim 1, wherein the structural support component forms a partial annulus about the flow tube when coupled to the flow tube.

4. The assembly of claim 1, wherein the structural support component extends along an entire length of the flow tube when coupled to the flow tube such that the flow tube is in direct contact with at least a portion of the structural support component along the entire length.

5. The assembly of claim 1, wherein the structural support component is different in a first and a second region relative to a third region, wherein the third region is flanked by the first region and the second region.

6. The assembly of claim 1, wherein the flow tube is configured to be reversibly coupled to the structural support component.

7. The assembly of claim 1, wherein the structural support component comprises a plurality of ribs distrubuted along its length, wherein the plurality of ribs are configured to receive the flow tube.

8. The assembly of claim 1, wherein the structural support component comprises at least one fin that extends in a lateral direction away from the flow tube.

9. The assembly of claim 1, comprising the flow tube coupled to the structural support component.

10. The assembly of claim 9, wherein the flow tube comprises a first location having increased stiffness relative to a second location of the flow tube.

11. An assembly comprising:
a flow tube configured to provide a flow path through the flow tube, wherein the flow tube has a first region and a second region, the first region and the second region both having a greater stiffness than a third region; and
a mechanical drive assembly configured to drive an oscillation of the flow tube while fluid is flowing through the flow path.

12. The assembly of claim 11, wherein the flow tube is formed from a material having variable wall thickness and wherein a first wall thickness of the first region and a second wall thickness of the second region are greater than a third wall thickness of the third region.

13. The assembly of claim 11, wherein the first region or the second region is 25% or less of a total length of the flow tube.

14. The assembly of claim 11, wherein the third region is longer than the first region and the second region.

15. The assembly of claim 11, wherein the third region is flanked by the first region and the second region.

16. The assembly of claim 11, wherein the first region, the second region, and the third region are arranged along a flow axis of the flow path.

17. The assembly of claim 11, wherein the flow tube defines a generally straight flow path.

18. The assembly of claim 11, wherein the flow tube is disposable.

19. The assembly of claim 11, comprising a structural support component reversibly coupled to the flow tube, wherein the structural support component couples to the flow tube to result in the greater stiffness of the first region and the second region relative to the third region.

20. The assembly of claim 11, wherein the stiffness is a bending stiffness.

21. A system comprising:
a fluid flow assembly, the fluid flow assembly comprising a flow tube, wherein the fluid flow assembly is configured to provide a flow path through the flow tube, wherein the flow tube is formed from a material having a first stiffness at a first location and a second stiffness at a second location, the first stiffness being greater than the second stiffness;
a mechanical drive assembly configured to drive an oscillation of the flow tube while fluid is flowing through the flow path; and
a sensor configured to sense the oscillation of the flow tube and generate a signal indicative of the oscillation.

* * * * *